Figure 1:
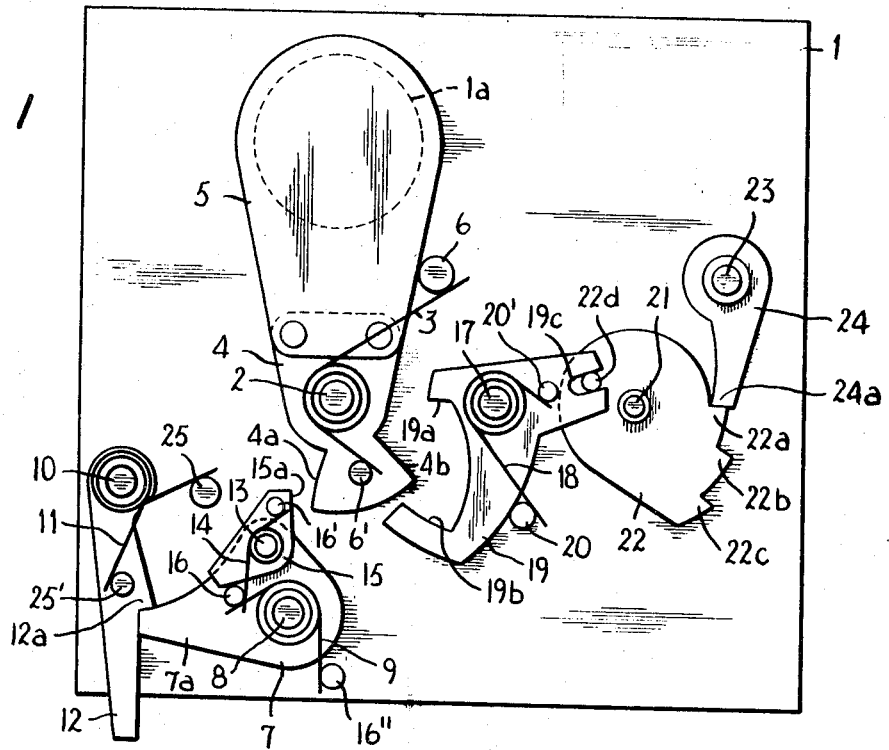

United States Patent
Kitai

[15] 3,678,837
[45] July 25, 1972

[54] EXPOSURE TIME CONTROL DEVICE FOR A CAMERA SHUTTER MECHANISM

[72] Inventor: Kiyoshi Kitai, 54 Tomihisa-cho, Shinjuku-ku, Tokyo, Japan

[22] Filed: April 13, 1970

[21] Appl. No.: 27,679

[52] U.S. Cl. ............................................................. 95/59
[51] Int. Cl. ......................................................... G03b 9/10
[58] Field of Search............................ 95/59, 53 EA, 53 EB

[56] References Cited

UNITED STATES PATENTS

| | | | |
|---|---|---|---|
| 3,418,904 | 12/1968 | Wick | 95/53 X |
| 3,437,026 | 4/1969 | Espig | 95/53 EB |
| 3,033,092 | 5/1962 | Ernisse | 95/59 |

*Primary Examiner*—Samuel S. Matthews
*Assistant Examiner*—Monroe H. Hayes
*Attorney*—Robert E. Burns and Emmanuel J. Lobato

[57] ABSTRACT

A camera having a shutter sector movable over and away from a shutter opening is provided with a variably settable holding means to releasably hold the opening is provided with a variably settable holding means to releasably hold the shutter sector in an open position away from the shutter opening for a preselected time duration. The shutter sector is always moved through nearly the same distance to effect an opening of the shutter opening regardless of the exposure time desired. The holding means comprises a lever which is moved into releasable engagement with the shutter sector by the shutter sector itself during its movement to the open position. The lever is moved out of engagement with the shutter sector after a predetermined time period by the action of a biasing spring afterwhich the shutter sector is rapidly moved over the shutter opening. The time duration in which the lever releasably holds the shutter sector in the open position is variable set in accordance with the desired exposure time.

11 Claims, 2 Drawing Figures

PATENTED JUL 25 1972

3,678,837

EXPOSURE TIME CONTROL DEVICE FOR A CAMERA SHUTTER MECHANISM

The present invention relates to an exposure time control device for a camera shutter mechanism for use with a camera employing a reciprocating shutter sector.

The conventional exposure time control devices for reciprocating shutter sectors comprise a shutter sector which is displaced from a closed position to a variable open position which is determined in accordance with the particular exposure time desired. If a relatively short exposure time is needed, the shutter sector is just barely moved away from the shutter opening whereas if a large exposure time is desired, the shutter sector is swung or reciprocated a substantial distance from the shutter opening. In other words, the prior art mechanisms employ a movable shutter which is displaced by an amount corresponding to the particular exposure time desired. If a long exposure time is needed, the shutter is displaced a predetermined distance away from the shutter opening such that the time that it takes for the shutter to move back into position where it completely covers the shutter opening corresponds to the desired exposure time. If a short exposure time is desired, the shutter sector is pivoted away from the shutter opening by a very small distance and then allowed to swing back over the shutter opening such that the desired exposure time corresponds to the time that it takes for the shutter sector to swing through its variably set opening distance and back to its closed position.

The major drawback of the above-mentioned exposure time control devices are that the length of the exposure time is directly related to the amplitude of displacement of the shutter sector. Hence, space necessary to accommodate the reciprocating action of the shutter sector increases as the exposure time is increased. Cameras employing the above-mentioned type of exposure time control device have a very definite and fixed ratio of exposure time ranges to actual size of the camera. Such cameras usually have a short exposure time of about 1/90 of a second and a long exposure time of about 1/40 of a second.

It is accordingly a principal object of the present invention to provide an exposure control device for a camera shutter mechanism wherein the exposure time is not related to the amplitude of displacement of the sector.

It is another object of the present invention to provide an exposure control device for a camera shutter mechanism wherein the controllable ratio of short exposure time to long exposure time can be greatly increased.

According to the present invention, a shutter sector cooperates with a variably settable holding means which holds the shutter in its open position for a predetermined exposure time period. The variably settable holding means is variably set in accordance with the desired exposure time. The shutter sector is spring biased towards its closed position and is opened by means of a manually actuated release lever cooperating with a spring biased driving lever. The variably settable holding means comprises a pivotally mounted control lever which releasably engages with the shutter sector when same is in its open position and disengages with the shutter sector after a variably set time period corresponding to the desired exposure time.

Figure 2:
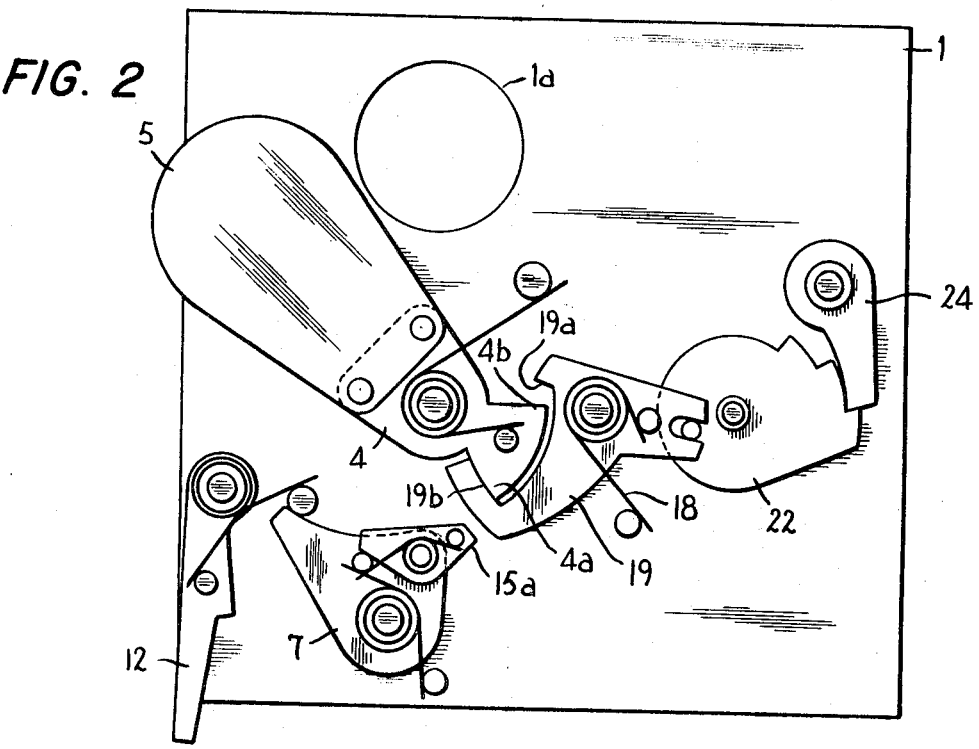

Other features and advantages of the exposure control device in accordance with the present invention will be better understood as described in the following specification and appended claims, when taken in conjunction with the following drawings in which:

FIG. 1 is a perspective view of a camera shutter mechanism embodying the exposure time control device of the present invention showing the shutter in its closed position and the various mechanisms in their charged or cocked condition; and FIG. 2 shows the camera shutter mechanism of FIG. 1 but in a different exposure time setting and wherein the shutter is in its open position.

A preferred embodiment of the present invention will now be explained in detail in conjunction with FIGS. 1 and 2. FIG. 1 depicts a camera shutter mechanism in its charged or cocked condition. A base plate 1 is provided with a shutter opening 1a. A shaft or pin 2 is mounted on the base plate 1 and receives therearound a biasing spring 3. In addition, a sector lever 4 is mounted for rotation on the pin 2 and is continually biased in a clockwise direction by the biasing spring 3 cooperating with a pair of pins 6, 6'. A shutter sector 5 is connected to the sector or blade lever 4 and functions to open and close the shutter opening 1a in response to pivotal movement of the sector lever 4 about the pin 2. The pin 6 is connected to the base plate 1 and also functions as a stop or limit pin effective to limit the clockwise movement of the sector 5 to a suitable position wherein it completely closes the shutter opening 1A.

A driving lever 7 is rotatably mounted on a shaft 8 which is fixed to the base plate 1. A biasing spring 9 is provided for continually biasing the driving lever in a clockwise direction about the shaft 8. The driving lever 7 is provided with an arm 7a which releasably engages with a release lever as hereinafter discussed.

Another pin 10 is fixed to the base plate 1 and a release lever 12 is rotatably mounted on the pin 10. A biasing spring 11 cooperates with a pair of stops 25, 25' to continually bias the release lever 12 in a counterclockwise direction about the pin 10. The release lever includes a projection 12a which releasably engages with the arm 7a of the driving lever 7.

A change-over mechanism is mounted on the driving lever 7 and permits the driving lever 7 to be recocked. The change-over mechanism comprises a pin 13 secured to the driving lever 7 and a change-over lever 15 rotatably mounted on the pin 13. A biasing spring 14 surrounds the pin 13 and cooperates with a pair of pins 16, 16' to continually urge the change-over lever in a counterclockwise direction around the pin 13. The change-over lever 15 is provided with a camming portion 15a which coacts with a camming surface 4a of the sector lever 4 to effect pivotal movement of the sector lever 4 in a counterclockwise direction in response to clockwise movement of the driving lever 7.

When the release lever 12 is manually actuated, the projection 12a disengages from the arm 7a of the driving lever thereby permitting the biasing spring 9 to rotate the driving lever 7 in a clockwise direction whereby the sector lever 4 along with the sector 5 is cammed into counterclockwise rotation about the pin 2, thus opening the shutter. When the shutter mechanism is recocked, the change-over lever 15 comes into contact with the bottom portion of the sector lever 4 and is thereby pivoted against the force of the spring 14 about the pin 13 to allow the driving lever 7 to move past the sector lever 4.

A control lever 19 is rotatably mounted on a pin 17 which is affixed to the base plate 1. A biasing spring 18 cooperates with a pair of pins 20, 20' to constantly bias the control lever 19 in a counterclockwise direction around the pin 17. The control lever 19 is provided with a camming projection 19a which coacts with a camming surface 4b of the sector lever 4 and another camming projection 19b which coacts with the aforementioned camming surface 4a of the sector lever 4. The control lever 19 is also provided with a slot 19c which connects the control lever 19 to a speed-regulating device.

A flywheel 22 is rotatably mounted on a pin 21 which is attached to the base plate 1. The flywheel 22 is provided with a plurality of step-like projections 22A, 22b, 22c which cooperate with the speed-regulating device. A pin 22d is connected to the flywheel 22 and rides in the slot 19c provided in the control lever 19 thereby providing the driving connection between the control lever 19 and the flywheel 22. A conventional speed-regulating device is connected to the base plate 1 and comprises a speed-regulating lever 24 having an end portion 24a which releasably engages with respective ones of the step-like projections 22a, 22b, 22c. The speed-regulating lever 24 is connected to a shaft 23 which is rotationally driven and preset in any desired position by an exposure meter, by hand, or by any other well known method. The step-like projection 22a corresponds to the most rapid exposure time whereas the projection 22c corresponds to the slowest exposure time, as more fully described below.

The operation of the present invention will now be explained. FIG. 1 shows the shutter sector 5 in its closed position and shows the various mechanisms in their charged or cocked positions. In FIG. 1, the end portion 24a of the speed-regulating lever 24 is preset to the position corresponding to the shortest exposure time and in such a position, the lever 24 is in releasable engagement with the projection 22a on the flywheel 22. With such a setting, the shutter sector 5 is set for its most rapid closing speed. When the release lever 12 is manually actuated to effect disengagement of the driving lever 7, the driving lever 7 rotates in a clockwise direction due to the force of the biasing spring 9 and the camming portion 15a of the change-over lever 15 comes in camming contact with the camming surface 4a and effects a counterclockwise movement of the sector lever 4, thereby opening the shutter opening 1A. The driving lever 7 continues to rotate in a clockwise direction until the arm 7a abuts against the stop pin 25 and during this rotation, the camming portion 15a moves out of contact with the cam surface 4A. As the sector lever 4 is pivoted in a counterclockwise direction against the action of the spring 3, the sector 5 is accordingly moved away from the shutter opening 1A. The sector 5 and the sector lever 4 are so dimensioned that when the sector 5 is completely away from the shutter opening 1A, the camming surface 4b strikes against the projection 19a of the control lever 19. The abutment of the sector lever 4 with the control lever 19 tends to rotate the control lever 19 in a clockwise direction, but such movement is prevented since the lever 24 is in engagement with the projection 22a of the flywheel and since the flywheel 22 is thus locked against counterclockwise rotation, the control lever 19 is prevented from undergoing clockwise rotation. The sector lever 4 is then rapidly driven in a clockwise direction by the compressive force stored in the spring 3 and the sector 5 rapidly closes over the shutter opening 1A. With such a setting of the speed-regulating lever 24, the sector 5 is rapidly moved through its shutter opening-and-closing cycle and such corresponds to the shortest exposure time.

FIG. 2 depicts the shutter mechanism in the open position and also shows the operation of the device when the speed-regulating lever 24 is set to engage with the step-like projection 22c corresponding to the longest exposure time. Again, the speed-regulating lever 24 is preset in a position corresponding to the desired exposure time and the various elements assume the position shown in FIG. 1 with the exception that the speed-regulating lever 24 occupies the position shown in FIG. 2. When the release lever 12 is manually depressed, the driving lever 7 rotates clockwise and the cam portion 15a of the change-over lever 15 comes into contact with and pivots the sector lever 4 in a counterclockwise direction around the pin 2 thereby opening the shutter opening 1A. As the sector lever 4 rotates in a counterclockwise direction, the camming surface 4b comes into contact with the camming projection 19a of the control lever 19 and pivots the control lever 19 in a clockwise direction about the pin 17.

It should be noted that with this setting of the speed-regulating lever 24, the flywheel 22 is free to rotate in a counterclockwise direction until the stop-like projection 22c engages with the end portion 24a of the speed-regulating lever. Thus, the motion of the driving lever 7 is transmitted through the sector lever 4 to effect a rotational movement of the control lever 19 and hence, a corresponding counterclockwise rotation of the flywheel 22. As the control lever 19 is driven in a clockwise direction, the biasing spring 18 is further compressed and the projection 19b is pivoted around the camming surface 4A, as shown in FIG. 2.

As the flywheel 22 rotates in a counterclockwise direction, the step-like projection 22c comes into engagement with the speed-regulating lever 24 thereby terminating the motion of the control lever 19 and the flywheel 22. As discussed above with reference to FIG. 1, the biasing spring 3 constantly tends to pivot the sector lever 4 in a clockwise direction to effect closing of the shutter opening 1a, but in this instance, the projection 19b releasably engages with the camming surface 4a thereby temporarily preventing the biasing spring 3 from closing the shutter sector 5. This temporary holding of the shutter sector in the open position exists for a predetermined time duration depending upon the variable setting selected for the speed-regulating lever 24. Meanwhile, the biasing spring 18 pivots the control lever 19 in a counterclockwise direction allowing the projection 19b to slide along the camming surface 4a until the engagement between these two members is terminated. As soon as the control member 19 disengages from the sector lever 4, the biasing spring 3 rapidly pivots the sector lever 4 along with the sector 5 in a clockwise direction effecting a closing of the shutter opening 1A.

It can thus be seen that the function of the control lever 19 is to control the exposure time of the shutter 1a by delaying the closing of the shutter sector 5 for a predetermined time period corresponding to the time interval selected by the speed-regulating lever 24. The speed-regulating lever 24, the flywheel 22 and the control lever 19 comprise a variably settable holding means which is operative to releasably hold the shutter sector in its open position for a variable and preselected time duration. In a similar manner, the speed-regulating lever 24 could be preset to engage with the step-like timing projection 22b and this would result in the projection 19b engaging with a smaller surface area of the camming surface 4a and hence result in a shorter exposure time. The control lever 19 is thus sequentially moved from its initial position by the camming action of the shutter to one of a plurality of different preselected holding positions (one of which is shown in FIG. 2) and then back to its initial position by the biasing force of the spring 18 to releasably hold the shutter in the open position for a time period determined by one of the holding positions. Any number of step-like timing projections 22a, 22b, 22c can be employed and it should be noted that the varying angular distance through which the flywheel 22 rotates determines the exposure time of the shutter mechanism. Alternatively, the flywheel 22 could be eliminated and step-like projections could be provided on the control lever 19 cooperating directly with the speed-regulating lever 24.

According to the present invention, the exposure time of a shutter mechanism can be variably set in a relatively simple manner. The operation of the control lever 19 permits the manufacturing of a camera having a much larger ratio of short exposure time to long exposure time without unduly increasing the size of the camera.

What I claim and desire to secure by Letters Patent is:

1. An exposure control device for a camera shutter mechanism comprising: a movably mounted shutter cyclically movable from a normally closed position to an open position and back to said closed position defining an exposure time; biasing means constantly biasing said shutter to said closed position; drive means for driving said shutter from said closed position to said open position and variably settable holding means sequentially movable from an initial position by said shutter during opening movement thereof to one of a plurality of different preselected holding positions each corresponding to a different preselected exposure time and then back to said initial position for releasably holding said shutter in said open position for a time period variably set in accordance with one of said preselected exposure times.

2. An exposure control device according to claim 1, wherein said variably settable holding means comprises a rotatably mounted control lever actuated during movement of said shutter to said open position to releasably hold said shutter in said open position; and means connected to said control lever for variably setting the time duration said control lever holds said shutter in said open position.

3. An exposure control device according to claim 2, wherein said last-mentioned means comprises a rotatably mounted member having a plurality of timing projections thereon each corresponding to a predetermined exposure time, a pivotally mounted regulating lever pivotal to a plurality of positions to effect releasable engagement with one of said projections during rotation of said member, and means connecting said control lever to said member to effect rotation of said member in response to rotational movement of said control lever.

4. An exposure control device according to claim 3, wherein said shutter includes two camming surfaces; said control lever includes a first projection releasably engageable with one of said camming surfaces during movement of said shutter to said open position to effect rotational movement of said control lever in one direction and a second projection releasably engageable with the other of said camming surfaces when said shutter is in said open position; and biasing means for continually biasing said control lever in a direction opposite to said one direction.

5. An exposure control device according to claim 4, wherein said drive means comprises a rotatably mounted driving lever rotatable in a driving direction to drive said shutter from said normally closed position to said open position; means for continually urging said driving lever in said driving direction; and a manually operable release lever cooperative with said driving lever to effect opening of said shutter.

6. An exposure control device according to claim 2, wherein said shutter includes two camming surfaces, and wherein said control lever includes a first projection releasably engageable with one of said camming surfaces during movement of said shutter to said open position to effect rotational movement of said control lever in one direction and a second projection releasably engageable with the other of said camming surfaces when said shutter is in said open position; and biasing means for continually biasing said control lever in a direction opposite to said one direction.

7. An exposure control device according to claim 6, wherein said drive means comprises a rotatably mounted driving lever rotatable in a driving direction to drive said shutter from said normally closed position to said open position; means for continually urging said driving lever in said driving direction; and a manually operable release lever cooperative with said driving lever to effect opening of said shutter.

8. An exposure control device according to claim 1, wherein said holding means comprises a movable control lever, means mounting said control lever for movement to said initial and holding positions, spring means continually biasing said control lever to said initial position, first means on said control lever engageable with said shutter to effect movement of said control lever from said initial position to one of said holding positions in response to opening movement of said shutter, second means on said control lever engageable with said shutter for releasably holding said shutter in said open position for a time period determined by the particular holding position of said control lever, and means for variably setting the desired holding position of said control lever in accordance with one of said preselected exposure times.

9. An exposure control device for a camera shutter mechanism comprising: a movably mounted shutter blade cyclically movable along a path from a normally closed position to an open position and back to said closed position defining an exposure time; biasing means constantly biasing said shutter blade to said closed position; drive means for driving said shutter blade from said closed position to said open position; and holding means biased towards an initial position and having a first projection projecting into the opening path of said shutter blade such that said holding means is displaced from said initial position by said shutter blade during movement of said shutter blade to said open position, said holding means having a second projection projecting into said shutter blade path behind said shutter blade when said holding means is displaced from its initial position for holding said shutter blade in said open position while said holding means is displaced from its initial position and releasing said shutter blade when said holding means returns to its initial position by its own biasing.

10. An exposure control device according to claim 9, wherein said holding means comprises a rotatably mounted control lever actuated during movement of said shutter blade to said open position to releasably hold said shutter blade, a rotatably mounted member having a plurality of timing projections thereof each corresponding to a predetermined exposure time, a pivotally mounted regulating lever pivotal to a plurality of positions to effect releasable engagement with one of said projections during rotation of said member, and means connecting said control lever to said member to effect rotation of said member in response to rotational movement of said control lever.

11. An exposure control device according to claim 9, wherein said shutter blade includes two camming surfaces; and wherein said holding means comprises a rotatably mounted control lever including a first projection releasably engageable with one of said camming surfaces during movement of said shutter blade to said open position to effect rotational movement of said control lever in one direction and a second projection releasably engageable with the other of said camming surfaces when said shutter blade is in said open position; and biasing means for continually biasing said control lever in a direction opposite to said one direction.

* * * * *